United States Patent [19]
Tsukamoto et al.

[11] Patent Number: 5,984,435
[45] Date of Patent: Nov. 16, 1999

[54] BRAKE CONTROL SYSTEM FOR VEHICLE

[75] Inventors: Masahiro Tsukamoto, Kanagawa; Hiroshi Takahashi, Tokyo; Katsunori Oshiage, Yokohama, all of Japan

[73] Assignee: Nissan Motor Co., Ltd., Yokohama, Japan

[21] Appl. No.: 08/827,176

[22] Filed: Mar. 27, 1997

[30] Foreign Application Priority Data

Mar. 29, 1996 [JP] Japan ................................ 8-076609
Jul. 16, 1996 [JP] Japan ................................ 8-186056

[51] Int. Cl.$^6$ .............................. B60T 7/16; B60T 8/24
[52] U.S. Cl. ........................ 303/191; 180/169; 303/192
[58] Field of Search ............................ 180/167–169, 180/272; 303/113.4, 113.5, 155, 160, 166, 167, 192, 193, 196; 364/426.01; 701/25, 28, 98

[56] References Cited

U.S. PATENT DOCUMENTS

| | | | |
|---|---|---|---|
| 3,978,481 | 8/1976 | Angwin et al. | 343/7 |
| 4,964,679 | 10/1990 | Rath . | |
| 5,332,057 | 7/1994 | Butsuen et al. | 180/169 |
| 5,389,050 | 2/1995 | Sakai et al. | 364/424.1 |
| 5,390,992 | 2/1995 | Walenty et al. | 303/112 |
| 5,436,835 | 7/1995 | Emry | 364/426.01 |
| 5,485,892 | 1/1996 | Fujita | 180/167 |
| 5,560,690 | 10/1996 | Hattori et al. | 303/116.2 |
| 5,577,812 | 11/1996 | Hirano et al. | 303/112 |
| 5,612,882 | 3/1997 | LeFebvre et al. | 364/449.3 |
| 5,694,321 | 12/1997 | Eckert et al. | 303/140 |
| 5,711,585 | 1/1998 | Tozu et al. | 303/146 |
| 5,816,667 | 10/1998 | Jokic | 303/113.4 |

FOREIGN PATENT DOCUMENTS

| | | |
|---|---|---|
| 38 05 589 A1 | 8/1989 | Germany . |
| WO 83/03230 | 9/1983 | WIPO . |
| WO9606763 | 3/1996 | WIPO . |

*Primary Examiner*—Chris Schwartz
*Attorney, Agent, or Firm*—Foley & Lardner

[57] ABSTRACT

A brake control system is comprised of a vehicle environment recognition device for obtaining vehicle environment including a road condition, an actuator for applying hydraulic pressure set at a target value to each wheel cylinder, and a controller for calculating the target value on the basis of the vehicle environment. The controller controls the wheel cylinder pressure by driving the actuator so as to adjusting the wheel cylinder pressure at the target value. Therefore, it becomes possible to ensure the same braking distance by the same depression degree of the brake even in various road conditions.

35 Claims, 11 Drawing Sheets

WHITE LINE

CENTER LINE

# BRAKE CONTROL SYSTEM FOR VEHICLE

BACKGROUND OF THE INVENTION

The present invention relates to a brake control system for a vehicle, and more particularly to an improved brake control system which is arranged to optimize its brake control according to the information from a vehicle environment recognition means.

A variety of vehicle brake systems have been proposed and in practical use. A Japanese Patent Provisional Publication No. 1-164656 discloses a typical brake system which has a function for preventing a reaction of nose-down pitching in the braking by the anti-skid brake system (ABS). This brake system is arranged to prevent the reaction of the nose-down pitching by slightly decreasing the brake pressure just before the vehicle stops and further to suppress troubles such as undesired elongation of the braking distance caused by the operation for preventing the nose-down pitching reaction upon taking account of the road inclination.

However, this brate system varies braking distance according to the road inclination even if a driver depresses a brake pedal in a constant manner. That is, this conventional brake system varies the braking distance before the control for preventing the reaction of the nose-down pitching during traveling on a sloop. More particularly, on a down-slope, the braking distance tends to be elongated since the gravitational acceleration reduces the braking force.

SUMMARY OF THE INVENTION

It is an object of the present invention to provide an improved brake control system which ensures the same braking distance to the same depression degree of a brake pedal even on various roads, including the ones on a slope.

Another object of the present invention to provide an improved brake control system which ensures the above-mentioned advantage by utilizing a forward monitoring camera or navigation system for recognizing a road condition.

A first aspect of the present invention resides in a brake control system for braking a vehicle which system comprises the steps of: recognizing vehicle environment from an vehicle environment recognizing means; deciding a brake control gain according to the recognized vehicle environment; deciding a target value of a braking force by correcting driver braking intent by means of the correction of the brake control gain; and controlling a brake actuator so as to generate the braking force corresponding with the target value.

A second aspect of the present invention reside in a brake control system for executing a braking of a vehicle which system comprises a driver brake intent detecting means and an actuator for applying braking force to each wheel on the basis of the detected driver braking intent. A controller controls a relationship between the driver braking intent and the braking force of each wheel according to environment information detected by a vehicle environment recognition device.

A third aspect of the present invention resides in a brake control system which comprises a road inclination measuring means for measuring inclination of a road. An actuator controllably changes the brake pressure generated at a pressure generating source for generating pressure corresponding to the brake operating force operated by a driver. The actuator applies the changed pressure to each wheel cylinder. A controller calculates a target value of the wheel cylinder pressure on the basis of the road inclination obtained by the road inclination measuring means. The controller controls the wheel cylinder pressure to the target value by driving said actuator.

With these arrangements, since the brake control gain is automatically decided according to the vehicle environment, the braking distance is kept the same as that of the flat road regardless of the inclination of the road. Therefore, the driver becomes free from executing a correcting operation of the brake pedal depression according to the vehicle environment. That is, the driver may keep the depression degree of the brake pedal same to obtain the same braking distance even in various road conditions.

DETAILED DESCRIPTION OF THE INVENTION

Referring to FIGS. 1 to 4, there is shown a first embodiment of a brake control system for a vehicle V in accordance with the present invention.

Figure 1:
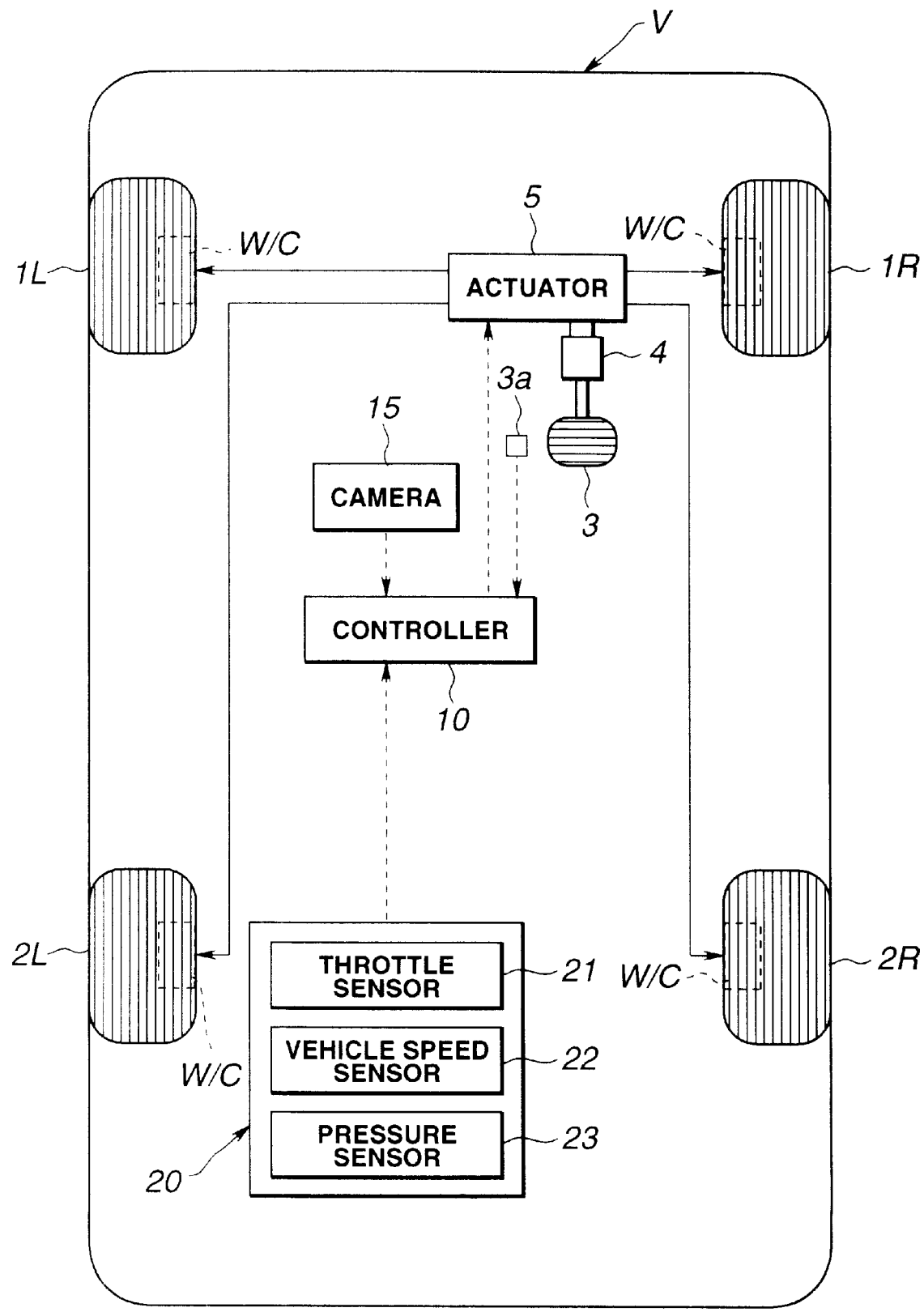
FIG. 1 is a schematic view of a first embodiment of a brake control system according to the present invention.

As shown in FIG. 1, the vehicle V has a pair of front wheels 1L and 1R and a pair of rear wheels 2L and 2R. Each wheel 1L, 1R, 2L, 2R has a brake disc (not shown) and a pair of brake pads which are operated by the operation of a wheel cylinder W/C so as to frictionally sandwich the brake disc during braking.

A brake operating system includes a pressure generating source which generates a pressure corresponding to the brake operation force, a brake pedal 3 and a master cylinder 4. The master cylinder 4 generating a master cylinder pressure Pm is communicated with each wheel cylinder W/C of each wheel 1L, 1R, 2L, 2R through a brake actuator 5. The brake actuator 5 is installed between the master cylinder 4 and each wheel cylinder W/C and controls the pressure of the wheel cylinder W/C. This brake actuator 5 has a function to increase the received pressure to the pressure greater than a master cylinder pressure Pm (pressure increasing function). Such type of actuators are disclosed in U.S. Pat. No. 4,653,815 and Japanese Patent Provisional Publication No. 6-270781.

The brake actuator 5 employed in the first embodiment of the brake control system is the same as that employed in the Japanese Patent Provisional Publication No. 6-270781. The brake actuator 5 is controllably operated only when a wheel cylinder pressure control or the other braking control such as ABS control is executed. In other situation, this brake actuator 5 is not operated, and the master cylinder pressure Pm is mechanically transferred to the wheel cylinders W/C. Therefore, the brake actuator 5 may be arranged to include a motor for pressure changing control and a cut valve of an electromagnetic control type.

When the driver of the vehicle V depresses the brake pedal 3, the master cylinder 4 outputs a hydraulic pressure corresponding to the brake pedal depression force. Each wheel cylinder W/C generates a braking force corresponding to the master cylinder pressure Pm to each wheel upon receiving the pressure through the brake actuator 5.

The brake control system of the first embodiment comprises a brake control actuator 5 which functions to preferably increase and decrease the wheel cylinder W/C and which executes a pressure changing control of the wheel cylinder on the basis of the information indicative of a road inclination. The brake control system according to the present invention comprises a controller 10 which includes a data processing device, a forward monitoring camera 15 and a vehicle condition detecting sensor unit 20.

Figure 2:
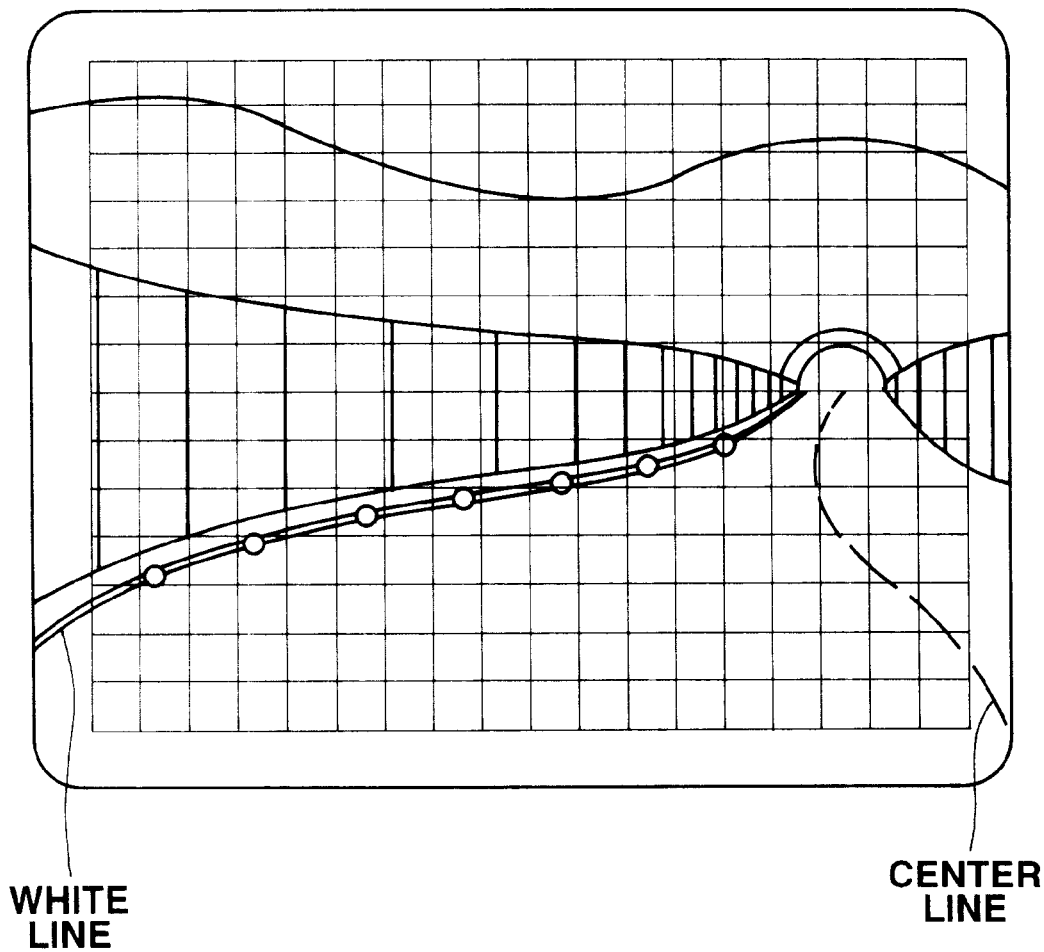
FIG. 2 is a picture view obtained by a forward monitoring camera installed in the brake control system of FIG. 1.

The controller 10 controls the brake actuator 5 upon receiving information from the forward monitoring camera 15 and the vehicle condition detecting sensor unit 20. The forward monitoring camera 15 is installed to a passenger compartment of the vehicle so as not to prevent the driver's visibility, such as to a reverse side of a door mirror or an opposite side to the driver of a front window. The forward monitoring camera 15 monitors a forward portion of the vehicle during the vehicle traveling and obtains picture information such as a forward view picture shown in FIG. 2. FIG. 2 shows a scenery in which the vehicle travels on a mountain road followed by a tunnel. The picture information obtained from the forward monitoring camera 15 is utilized to obtain the road inclination on a now traveling road. The controller 10 processes the obtained picture information and outputs a command signal to the brake actuator 5.

The vehicle condition detecting sensor unit 20 includes a throttle sensor 21 for detecting an opening degree TH of a throttle valve of a vehicle engine, a vehicle speed sensor 22 for detecting a vehicle speed Vs and a pressure sensor 23 for detecting the master cylinder pressure Pm. Further, It will be understood that the vehicle condition detecting sensor unit 20 may include an engine rotation speed sensor for detecting the engine rotation speed Ne, a brake pressure sensor and so on (not shown in FIG. 1).

The controller 10 receives a signal indicative of a braking signal (on-off signal) as to whether the brake pedal 3 is depressed or not, from a brake switch 3a installed to the brake pedal 3. The controller 10 basically calculates a target value of the wheel cylinder pressure Pw/c on the basis of the road inclination and controls the wheel cylinder pressure Pw/c by driving the brake actuator 5, in order to keep the braking distance corresponding to the brake pedal depression degree constant even If the road inclination is varied. Further, the controller 10 executes the wheel cylinder pressure control on the basis of the obtained information.

The controller 10, which uses a picture from the forward monitoring camera 15 in order to measure the road inclination, may apply a method for obtaining the road inclination by obtaining the change ratio of the road inclination from the picture information of the forward monitoring camera 15 and by obtaining the integral of the change ratio from the initial inclination value. Further, if such mentioned method is applied in this embodiment, the position whose inclination to be calculated is changed according to the vehicle speed information. The controller 10 may be arranged to decide the target value of the wheel cylinder pressure in proportion to the measured inclination if the target value of the wheel cylinder pressure Pw/c is calculated and set. A proportion constant for deciding the target value of the wheel cylinder pressure Pw/c may be a value determined by the vehicle standard loaded weight and the brake system items.

Figure 3:
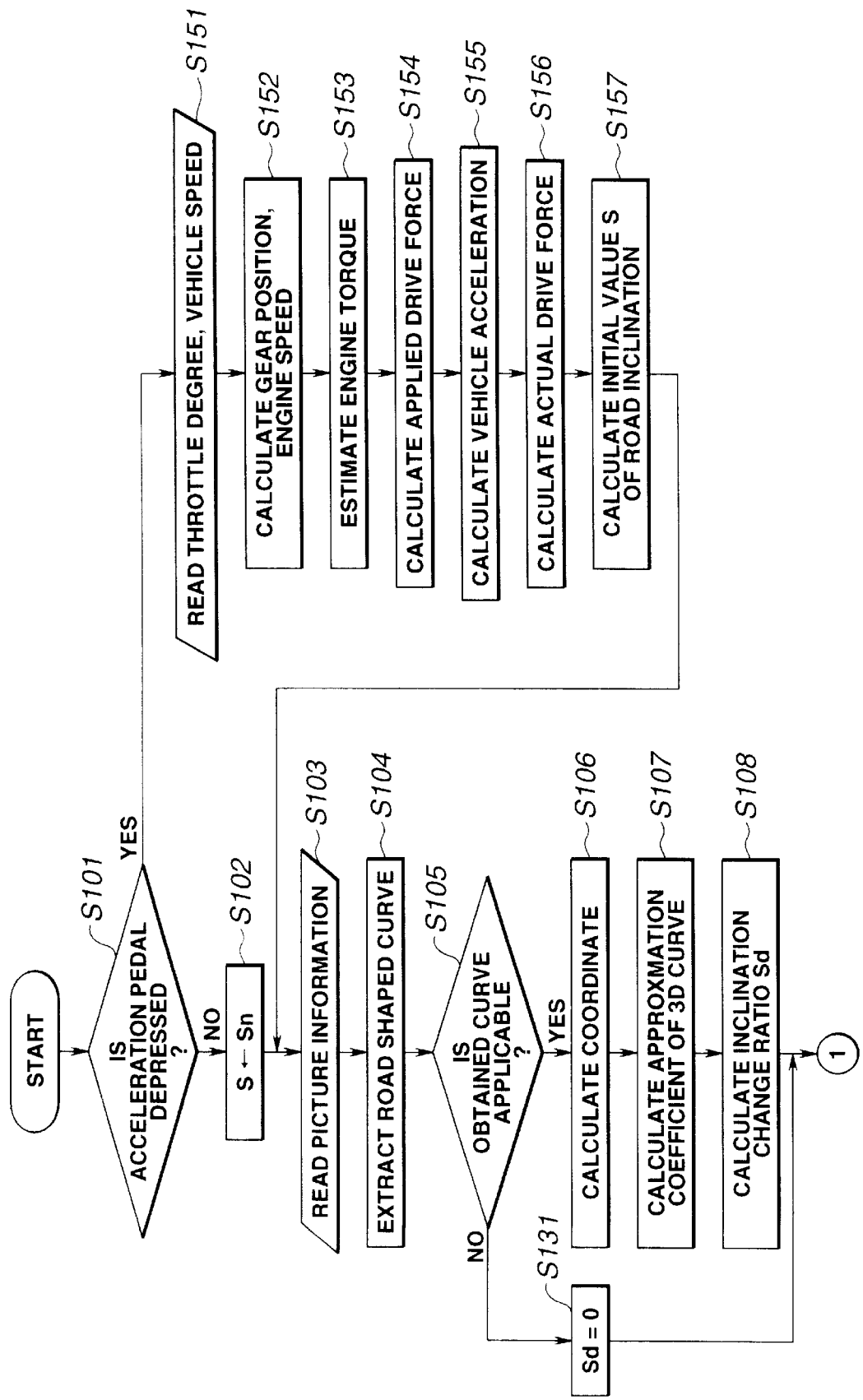
FIG. 3 is a part of a flowchart showing a control program of the first embodiment.
Figure 4:
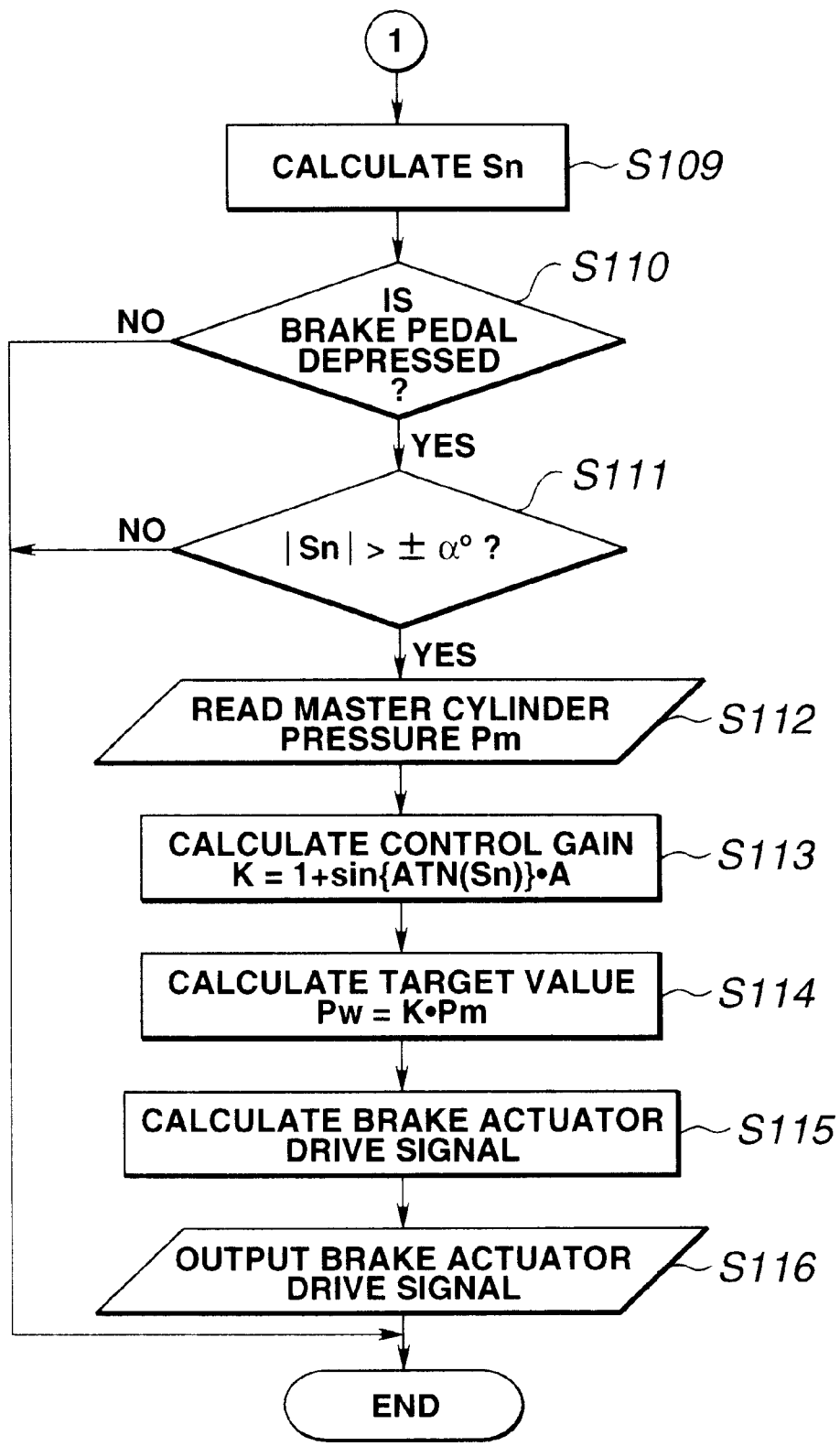
FIG. 4 is the other part of the flowchart of the control program of the first embodiment.

FIGS. 3 and 4 show a flowchart indicative of the manner of operation executed by the brake control system according to the present invention. This control program is executed by the controller 10 at predetermined intervals Ts.

At a step S101, the controller 10 decides according to the signal from the throttle sensor (acceleration opening degree sensor) 21 as to whether the acceleration pedal is depressed or not. When the answer at the step S101 is YES, the routine proceeds to a step S151 to estimate the road inclination from the output of the engine and to obtain an initial value for calculating the road inclination when the acceleration pedal is not depressed.

At the step S151, the controller 10 obtains the throttle (accelerator) opening degree and a vehicle speed Vs on the basis of the signals from the throttle sensor 21 and the vehicle speed seniors 22.

At a step S152, the controller 10 obtains the gear position of an automatic transmission (not shown) and an engine rotation speed Ne from the obtained throttle opening degree and the vehicle speed.

At a step S153, the controller 10 calculates the output torque on the basis of the throttle opening degree, the engine rotation speed and an engine characteristic map.

At a step S154, the controller 10 calculates the drive force applied to the vehicle upon taking account of the transmission ratio and the diameter of tires.

At a step S155, the controller 10 calculates a vehicle acceleration ((d/dt)Vs) on the basis of the previous vehicle speed Vs and the change width ΔAVs.

At a step S156, the controller 10 obtains an actual drive force by multiplying the vehicle weight M (weight of a standard loaded vehicle) with the acceleration.

At a step S157, the controller 10 calculates the road inclination by using a difference Fs between the applied drive force obtained at the step S154 and the actual drive force obtained at the step S156 and the following equations (1) and (2).

$$S = \tan \theta \quad (1)$$

$$\theta = \sin^{-1}\{Fs/(M \cdot g)\} \quad (2)$$

wherein θ is an inclination angle, M is the weight of the loaded vehicle, and g is a gravity.

The obtained inclination value S is used as an initial value.

In this program, the deviation of the vehicle weight, a running resistance and the aerodynamic resistance of the vehicle are neglected and an erroneous affectation due to this neglected factor is cut by a non-feeling range treatment executed at a step S111.

On the other hand, when the controller 10 decides at the step S101 that the acceleration pedal is not depressed, the routine proceeds to a step S102 wherein the previous inclination value Sn is set as a present initial value S. The steps following to the step S101 execute a series of processes, such as a reading of picture information, an extraction of a curve indicative of a road shape, a decision as to whether an effective extraction is executed, a point setting and the calculation of the coordinate value, a calculation of a coefficient by approximating to a three-dimensional curve, a calculation of the inclination change ratio Sd by the coordination conversion of the coefficient, and the calculation of the road inclination Sn by the integration Sd by the initial value S.

At a step S103, the controller 10 reads picture information from the forward monitoring camera 15. The picture information is a still picture at a time that the step S103 is executed as shown in FIG. 2.

At a step S104, the controller 10 extracts characteristic portions of the obtained still picture, such as a white line of a roadside, a center line or an outline of a side wall. For example, at this step S104, the controller 10 extracts a white line of a roadside which is shown by a double line in FIG. 2.

At a step S105, the controller 10 decides as to whether the curve obtained at the step S104 is applicable in the following processing or not. When the answer at the step S104 is YES, the routine proceeds to a step S106. When the answer at the step S104 is NO, that is, when the obtained curve is incomplete due to some obstacles or other factor, the controller 10 decides that it is impossible to execute the following processing by using the obtained information. Therefore, the routine proceeds to a step S131 wherein the controller 10 temporally sets the inclination change ratio Sd to 0.

At the step S106, the controller 10 selects several points on the white line and determines their coordinates. It is necessary to select at least four points to execute aforementioned approximation, and the increase of the selected points improves the accuracy of the approximation processing. The number of the selected points will be determined upon taking account of the time necessary for the calculation thereof. In this embodiment, the seven points are selected on the white line as shown in FIG. 2. The coordinate of each selected point is determined by setting vertical and horizontal coordinates as shown by vertical lines and horizontal lines shown in FIG. 2. In FIG. 2, horizontal direction is denoted by X value and vertical direction is denoted by Y value, such as (Xi, Yi) wherein i represents the order from the most apart point.

At a step S107, the controller 10 executes the approximation of the white curve as being expressed by the following third order equation (3):

$$Y = a_3 \cdot X^3 + a_2 \cdot X^2 + a_1 \cdot X + a_0 \tag{3}$$

The approximation in this step S107 is executed to obtain the above coefficients $a_0$ to $a_3$ by solving the following determinant (4).

$$\begin{bmatrix} a_3 \\ a_2 \\ a_1 \\ a_0 \end{bmatrix} = \begin{bmatrix} \Sigma Xi^6 & \Sigma Xi^5 & \Sigma Xi^4 & \Sigma Xi^3 \\ \Sigma Xi^5 & \Sigma Xi^4 & \Sigma Xi^3 & \Sigma Xi^2 \\ \Sigma Xi^4 & \Sigma Xi^3 & \Sigma Xi^2 & \Sigma Xi \\ \Sigma Xi^3 & \Sigma Xi^2 & \Sigma Xi & m \end{bmatrix}^{-1} \begin{bmatrix} \Sigma Y \cdot Xi^3 \\ \Sigma Y \cdot Xi^3 \\ \Sigma Y \cdot Xi^3 \\ \Sigma Y \end{bmatrix} \tag{4}$$

wherein $\Sigma \eta Xi$ represents $X_1 + X_2 + \text{- - -} + Xm$, and m is the number of the selected points.

Next, at a step S108, the controller 10 executes a series of conversions of the coefficients $a_0$ to $a_3$ obtained from the equation (4), and more particularly to a coordinate system of the picture in the monitor→a coordinate system on the basis of the vehicle→a coordinate system of the road, in order to obtain the information that the road is raised up by H(m) per L(m) proceeding from the road function. By using these H and L, the inclination of the road Sd is obtained as H/L. Since this inclination Sd is determined on the basis of the direction of the vehicle, the change ratio of the road inclination is in turn changed wherein L is changed according to the vehicle speed Vs so as to be defined by the following equation (5).

$$L = Vs \cdot Ts \tag{5}$$

wherein Ts is a control period which is a time period from a present picture reading to next picture reading.

Following to the execution of the step S108, the routine proceeds to a step S109 wherein the controller 10 obtains a present inclination Sn by using the change ratio Sd of the road inclination obtained at the step S108 or the step S131, and one of the inclination S obtained in the acceleration pedal depressed condition and the inclination S obtained by the previous calculation.

The present inclination Sn is obtained by using the following equation (6).

$$Sn = S + Sd \tag{6}$$

wherein the up-grade of the inclination is represented by "−", and the down-grade of the inclination is represented by "+".

The obtained value Sn represents the inclination at a time that the picture is next read, and not at a time that the control output is output. Therefore, if the time period Tc from the picture reading to the control output outputting is largely different from the control period Ts, the inclination value used in the control is adjusted by controlling the change ratio value Sd according to the ratio Tc/Ts. That is, such adjustment is, for example, executed by using the following equation (7).

$$Sn' = S + Sd \cdot Tc/Ts \tag{7}$$

Since this adjusting control obtains the inclination at the time Tc upon assuming that the inclination S is gradually changed to S+Sd by the movement from the present position to L=VsTs preceding, it becomes possible to execute a control so as not to cause an offset between the control output and the inclination.

Where the change ratio of the inclination is obtained from the picture information from the forward monitoring camera 15, when the position taking account of the inclination change is variably determined according to the vehicle speed Vs, it is preferable to apply the above-mentioned methods thereto.

After the execution of the step S109, the routine proceeds to a step S110 wherein the controller 10 decides according to the signal from the brake switch 3a as to whether the brake pedal 3 is depressed or not, in order to decide as to whether the pressure control of the wheel cylinder is to be executed or not. When the brake pedal 3 is not depressed, the routine jumps to END. When the brake pedal 3 is depressed, the controller 10 executes the processing for controlling the wheel cylinder pressure Pw/c in steps S111 to S116 such that the braking distance by the same manner of braking pedal depression always becomes equal regardless the inclination of the road. This prevents the radical proximity to a preceding vehicle and running over a stopping line by the down-slope road braking, and radical brake of the rearward vehicle in the up-road braking.

When a driver depresses the brake pedal 3, at a step S111, the controller 10 decides as to whether the absolute value of the inclination value Sn (Sn') is greater than a predetermined neutral zone α° or not. The decision value α is previously determined so as not to execute undesired control upon taking account of the detection accuracy and noise.

At the step S111 of the program routine, when the absolute value |Sn| is not greater than the value α1, the control of the wheel cylinder pressure Pw/c is not executed and the routine jumps to the END step. When the controller 10 decides at the step S111 that the absolute value |Sn| is greater than the value α1, the routine proceeds to a step S112 wherein the controller 10 reads the master cylinder pressure Pm on the basis of the signal of the master cylinder pressure sensor 23.

At a step S113, the controller 10 calculates the control gain K by using the following equation (8).

$$K = 1 + \sin(\tan^{-1} Sn) \cdot A \quad (8)$$

wherein A is a control constant relating to the efficiency of this control and is determined according to the brake system characteristics as follows.

$$A = M \cdot g / (2 \cdot Ac \cdot \mu \cdot Rd / Rt) \quad (9)$$

wherein M is a vehicle weight, g is a gravity, Ac is a pressure receiving area of the wheel cylinder W/C, $\mu$ is a friction coefficient of a brake pad, Rt is a radius of the tire, and Rd is an effective diameter of the disc. The front and rear brake systems respectively have the values Ac, Rd and Rt.

At a step S114, the controller 10 obtains the target value Pw of the wheel cylinder pressure by multiplying the control gain K obtained at the step S113 with the master cylinder pressure value Pm read in the step S112 as follows.

$$Pw = K \cdot P \quad (10)$$

Accordingly, the target value Pw of the wheel cylinder pressure Pw/c is determined so as to cancel the gravity amount generated by the inclination relative to the master cylinder pressure Pm.

At a step S115, the controller 10 calculates a drive signal to the brake actuator 5 in order to generate the target pressure Pw.

In this embodiment, the brake actuator 5 is of an electromotive type that is similar to that shown in the JP-A-6-270781. Therefore, the controller 10 calculates the motor drive current value corresponding to the target value Pw. The controller 10 outputs this calculated current value and a drive signal of the cut valve to the brake actuator 5 to control the wheel cylinder pressure at the target value Pw.

The above-mentioned execution of the program is one cycle of the control, and this cycle is repeated by a proper control calculation cycle Ts to control the operation during the vehicle traveling.

Although the first embodiment have been shown and described such that the control is executed to keep a braking distance relative to a predetermined brake pedal depression constant even in the up-slope, down-slope and flat road, it will be understood that the control may be stopped when the vehicle travels up-slope so as to decrease the braking distance. More particularly, such deformation can be executed by changing the absolute value Sn to be compared with the neutral zone a to the value Sn. This changes the control so as not to execute the control when the vehicle travels the up-sloop.

Where it is desired to determine the target value Pm of the wheel cylinder by increasing the master cylinder pressure Pm in proportion to the measured inclination angle, the above-mentioned modification may be applied to this brake control.

As mentioned above, according to the program of the first embodiment, the control of the wheel cylinder pressure is properly executed during the braking. More particularly, the brake control is executed as follows.

Before the vehicle is stopped by depressing the brake pedal 3, the vehicle is always started by the depression of the acceleration pedal. In this situation, the initial value S is set in the steps S151 to S157 shown in FIG. 3 and therefore the initial value is always set.

Then, after the start of the vehicle, when the vehicle travels on a down-sloop and the driver releases the acceleration pedal, the control step proceeds to the routine following to the step S102, and therefore the controller 10 calculates the inclination of the road on the basis of the picture information of the forward monitor camera 15 as executed in the steps S103 to S109.

When the vehicle travels on the down-sloop by using the engine brake, the controller 10 calculates the inclination of the down-sloop in the steps S110 to END shown in FIG. 4. In this situation, when the driver depresses the brake pedal 3, the brake control is started by executing the pressure control of the wheel cylinder W/C in a manner that the processing from the step S112 to the step S116 is repeatingly executed.

During the travel on the down-sloop, the value Sn takes the plus "+" value so that the control gain K becomes greater than 1 as executed in the step S113. Accordingly, although the target pressure of the wheel cylinder W/C becomes greater than the pressure value Pm of the master cylinder 4, the difference between the target value and the master cylinder pressure value Pm corresponds to the gravity applied to the vehicle in the first embodiment. Therefore, since the wheel cylinder pressure Pw/c is controlled at the target value Pw by the execution of the steps S112 to S116, the braking distance is kept being the same as that in the flat road by the proper control. Similarly, during the up-road traveling, since the pressure is deceased by the amount of the gravity, the braking distance is kept being the same as in the flat road by canceling the decreased amount of the gravity.

According to the brake control, the braking pressure is changed to cancel the amount of the gravity corresponding to the inclination of the road, and therefore the braking distance is kept being the same as that in the flat road without being affected by the inclination of the road. Therefore, by depressing the brake pedal 3 on the radical slope as is similar to a case of the flat road traveling, the braking distance becomes equal to that in the flat road so as to prevent the radical proximity to the preceding vehicle or radical braking of the following vehicle.

When the forward monitor camera 15 is used as a road inclination measuring device, It becomes possible to obtain the inclination in the future point. This compensates the delay due to the calculations in the control. Further, the measuring points of the inclination of the road may be change according to the vehicle speed Vs, so that it becomes possible to output the control output at a proper timing.

Figure 5:
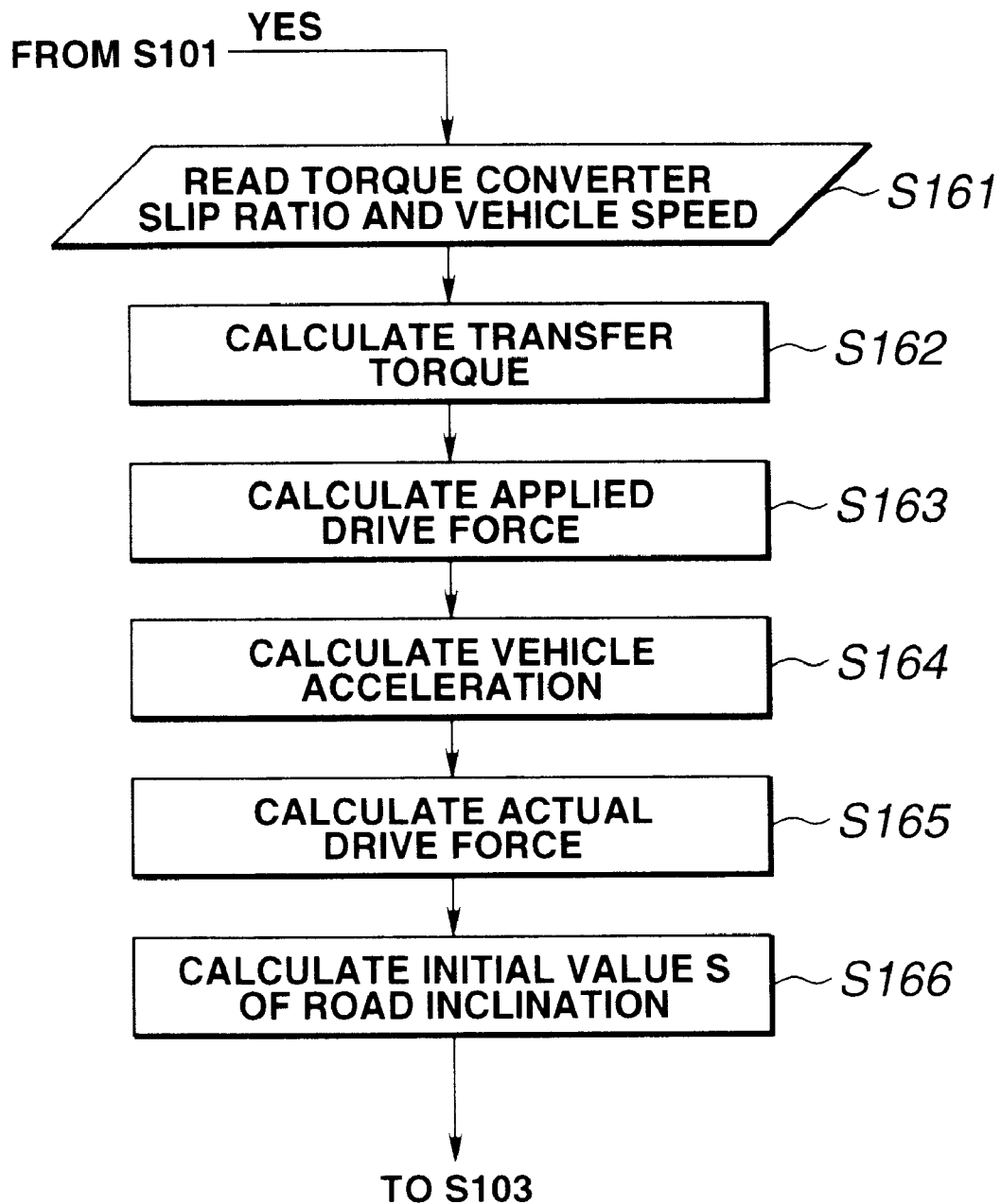
FIG. 5 is a part of a flowchart for the brake control of a second embodiment.

Referring to FIG. 5, there is shown a second embodiment of the brake control system according to the present invention. The construction of the second embodiment is basically the same as that of the first embodiment. The second embodiment is arranged to control the wheel cylinder pressure Pw/c as is the same as in the first embodiment. The brake control system of the second embodiment comprises an inclination measuring means for measuring the inclination of the road during the vehicle traveling and a brake actuator 5 which has a function to properly change a brake pressure generated at the master cylinder 4 properly and to supply it to the wheel cylinder W/C. The controller 10 calculates the target value Pw of the wheel cylinder pressure Pw/c on the basis of the road inclination Sn obtained by the inclination measuring means, and the wheel cylinder pressure Pw/c is controlled by driving the brake actuator 5. The second embodiment is arranged to obtain an initial inclination value S to be applied to the road inclination calculation from the drive force obtained from the slip ratio of the torque converter and the acceleration of the vehicle.

In this second embodiment, the vehicle condition sensor unit 20 includes the vehicle speed sensor 22, a slip ratio sensor for detecting a slip ratio T/Cs of the torque converter and a master cylinder pressure sensor 23. Further, the program for setting the initial value corresponding to the steps S151 to S157 of the first embodiment is changed as shown in FIG. 5.

As shown in FIG. 5, the routine proceeds from the step S101 to a step S161 wherein the controller 10 reads the slip ratio T/Cs of the torque converter and the vehicle speed on the basis of the signals from the slip ratio sensor and the vehicle speed sensor 33.

At a step S162, the controller 10 calculates the output rotation speed Nt of the torque converter on the basis of the vehicle speed Vs and the gear ratio, and obtains the transfer torque of the torque converter with reference to a characteristic map of the torque converter and on the basis of the output rotation speed Nt and the slip ratio T/Cs.

At a step S163, the controller 10 obtains an applied torque corresponding to the obtained transfer torque of the torque converter.

Steps S164 to S166 are the same as the steps S155 to S157 of the first embodiment. These steps are executed to obtain the initial value of the road inclination. This operation and function obtained by the steps S164 to S166 are completely the same as the steps S155 to S157 of the first embodiment, and therefore the explanation thereof is omitted herein.

By the processing of the steps S161 to S166, the initial value is obtained from the drive torque through the torque converter. Therefore, the initial value S is further accurately obtained as compared with the first embodiment wherein the initial value is estimated from the engine characteristics. Accordingly, It becomes possible to execute a further accurate control, for example, to expand the controllable area by decreasing the neutral zone α. It will be understood that the second embodiment may be combined with the first embodiment such that the method for calculating the initial value is switched in case by case and the neutral zone a is similarly switched.

Figure 6:
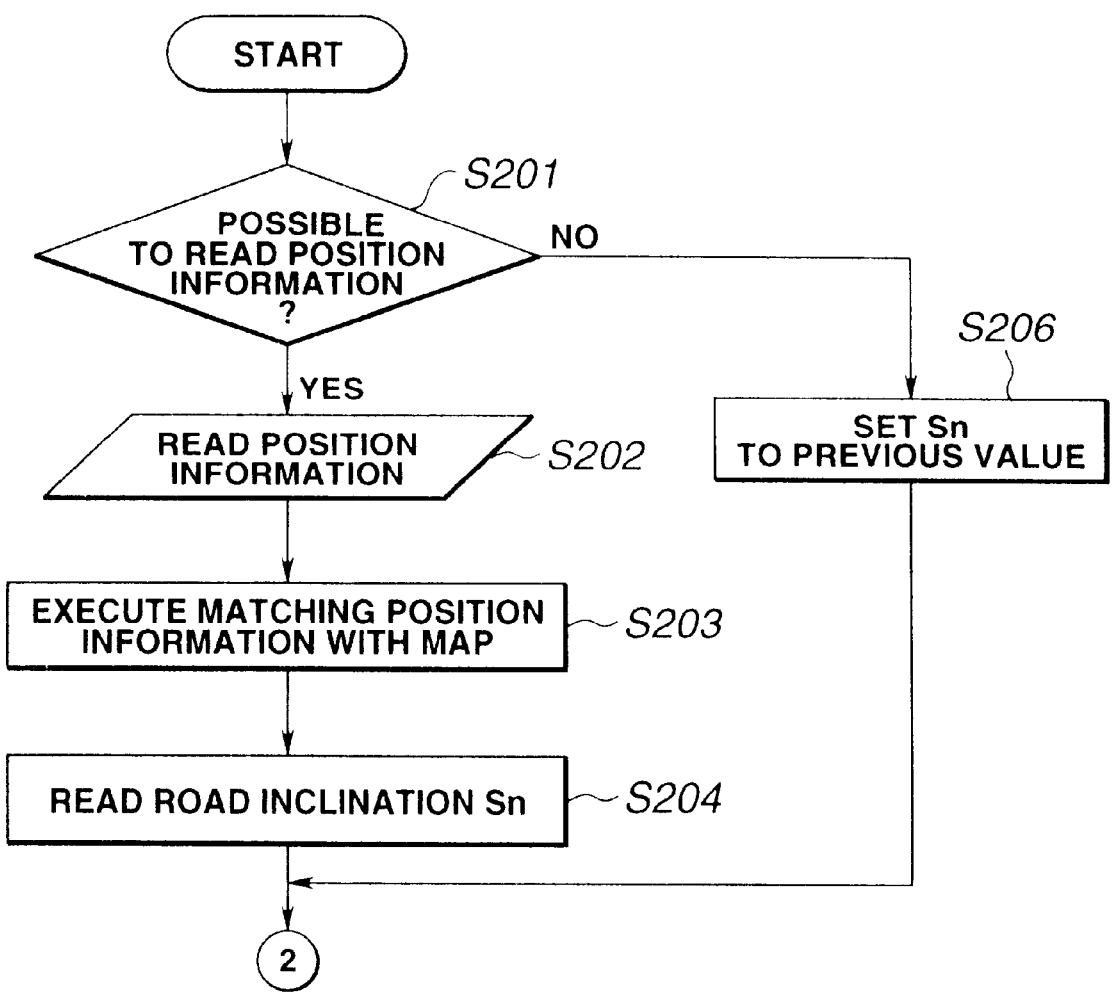
FIG. 6 is a part of a flowchart for the brake control of a third embodiment.
Figure 7:
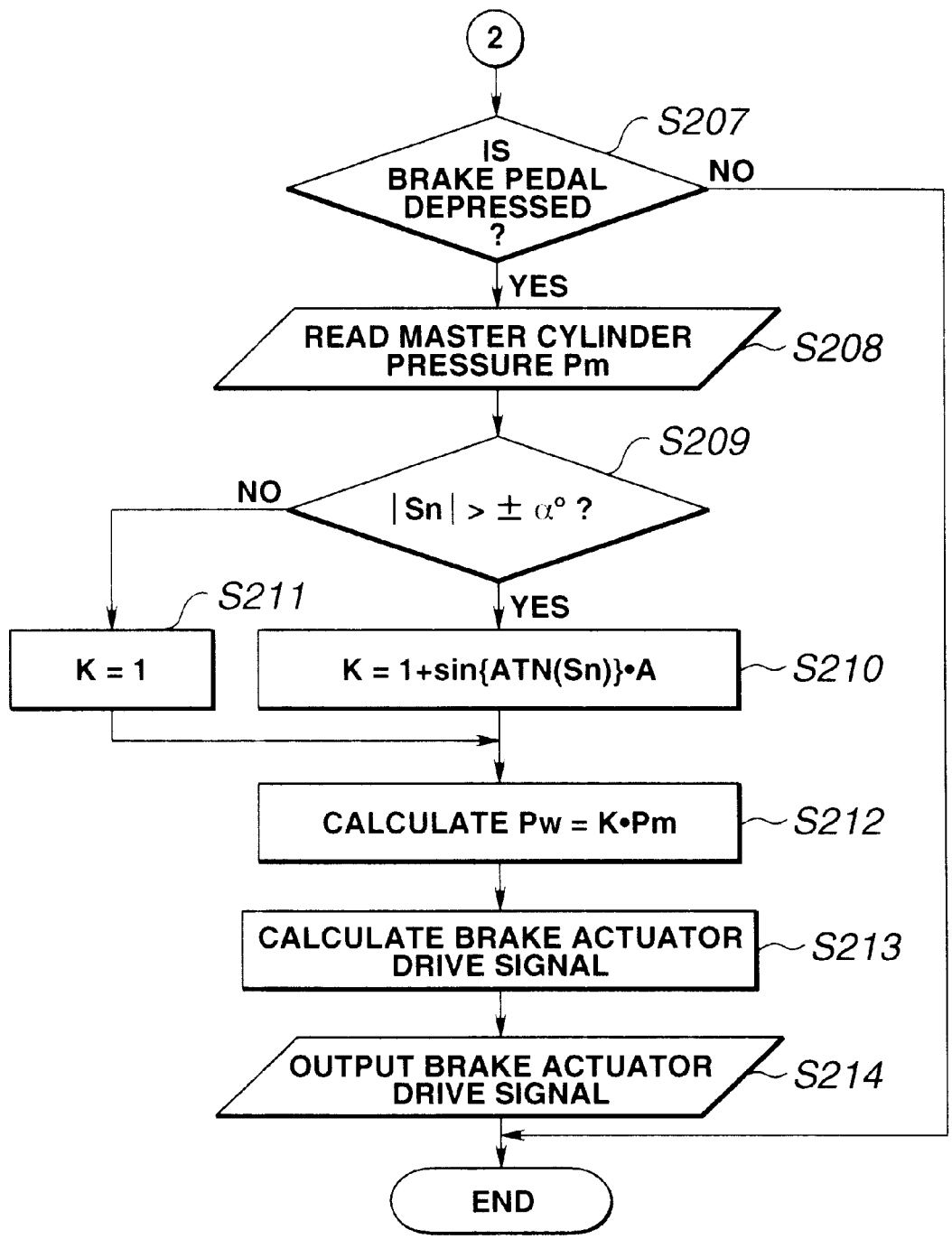
FIG. 7 is the other part of the flowchart of the third embodiment.

Referring to FIGS. 6 and 7, there is shown a third embodiment of the brake control system. The third embodiment is arranged to obtain the inclination of the road on the basis of the vehicle position information from a navigation system functioning as an inclination measuring means and map data and the change of the vehicle position. The construction of the third embodiment is basically the same as that of the first embodiment except that the navigation system is used instead of the forward monitoring camera 15. Further, the third embodiment is arranged such that the vehicle condition sensor unit 20 includes only the master cylinder pressure sensor 23 in addition that the navigation system is applied instead of the forward monitor camera 15.

The bake actuator 5 is of an electric-drive type and is normally controlled. The master cylinder pressure Pm is always detected, and the wheel cylinder pressure Pw/c is controlled at the target pressure value such the target value Pw in the brake control of the present invention or a control target value of the ABS control when the above-mentinoed brake control or the ABS control is executed. When both of the above two controls are not executed, the wheel cylinder pressure Pw/c is controlled so as to follow the master cylinder pressure Pm.

In this third embodiment employing the navigation system, the control program executed in the controller 10 includes a decision as to whether reading of the position information is possible, reading of the position information, matching between the position information and the navigation map, and the calculation of the road inclination Sn as shown in a flowchart of FIGS. 6 and 7.

At a step S201, the controller 10 decides as to whether it is possible to read the position information or not. When the answer at the step S201 is NO, the routine jumps to a step S206 wherein the road inclination value Sn is set so as to be the same as the previous value. Following this step S206, the routine proceeds to a step S207. When the answer at the step S201 is YES, the routine proceeds to a step S202 wherein the controller 10 reads the position information from the navigation system.

At a step S203, the controller 10 executes a matching between the position information and the map of the navigation system.

At a step S204, the controller 10 obtains the road inclination data Sn.

The position indicative of a location of the vehicle may be a present traveling position or a future position where the vehicle arrives when the calculation is finished upon taking account of the vehicle speed VS and the control calculation time. In this third embodiment, the measuring of the road inclination from the map data by means of the navigation system may use a traveling position which is preceded according to the vehicle speed Vs. If the later-mentioned position is selected, it becomes possible to execute the accurate control even in a condition that the road inclination is largely changed during the calculation. Further, the position information may be obtained as a three-dimension information, and the road inclination may be obtained by comparing the horizontal value and the vertical value of the present three-dimension information with those of the previous thee-dimension information.

Following to the execution of the step S204 or the step S206, the routine proceeds to a step S207 wherein the controller 10 decides as to whether the brake pedal 3 is depressed or not. When the answer at the step S207 is NO, the program routine jumps to the END. When the answer at the step S207 is YES, the routine proceeds to a step S208 wherein the controller 10 reads the master cylinder pressure Pm on the basis of the signal from the master cylinder pressure sensor 23. Therefore, the master cylinder pressure Pm is monitored during the braking operation.

At a step S209, the controller 10 decides as to whether the absolute value of the inclination value Sn (Sn') is greater than a predetermined neutral zone α° or not. The decision value α° is previously determined so as not to execute undesired control upon taking account of the detection accuracy and noise. When the absolute value |Sn| is not greater than the value α°, the routine proceeds to a step S211 wherein the control gain K is set at 1 (K=1). When the controller 10 decides that the absolute value |sn| is greater than the value α°, the routine proceeds to a step S210 wherein the controller 10 calculates the control gain K as is the same as the processing in the step S113 of the first embodiment (K=1+sin(tan$^{-1}$Sn)·A).

The processing from a step S212 to a step S214 is the same as that of the steps S114 to S116 in the first embodiment. Accordingly, the wheel cylinder pressure Pw/c is controlled at the target value Pw by controlling the brake actuator 5. Therefore, when the answer at the step S209 is YES, the wheel cylinder pressure Pw/c is controlled according to the road inclination Sn as is similar to the first embodiment. When the answer at the step S209 is NO, the control gain K is set at 1 and therefore the wheel cylinder pressure Pw/c is controlled to follow the master cylinder pressure Pm (Pw/c=Pm).

With the thus arranged third embodiment, the cost for producing the brake control system according to the present invention since the navigation system is utilized as a road inclination measuring means of the brake system. Further, since it is possible to facilitate the approximation calculation and the coordinate transformation for obtaining the road inclination in the controller 10, the software to be installed in the controller 10 is further simplified. This decreases the production cost of the software.

Since the brake actuator 5 is of the normal-control type, the braking in the actuator operative condition and the braking in the actuator inoperative condition are continuously changed. This prevents the kick back to the brake pedal 3 at the start of the control to naturally execute the control.

Referring to FIGS. 8 to 11B, there is shown a fourth embodiment of the brake control system according to the present invention. The fourth embodiment shows an improved and developed modification of the third embodiment. Schematically, this fourth embodiment Is arranged such that the environment of the vehicle including the road inclination is recognized, the brake control gain K is set according to the vehicle environment, and a target value for each wheel 1L to 2R is determined by the control gain K. Therefore, even if the vehicle environment is varied, the braking distance is kept equal relative to the equal depression of the brake pedal 3.

Figure 8:
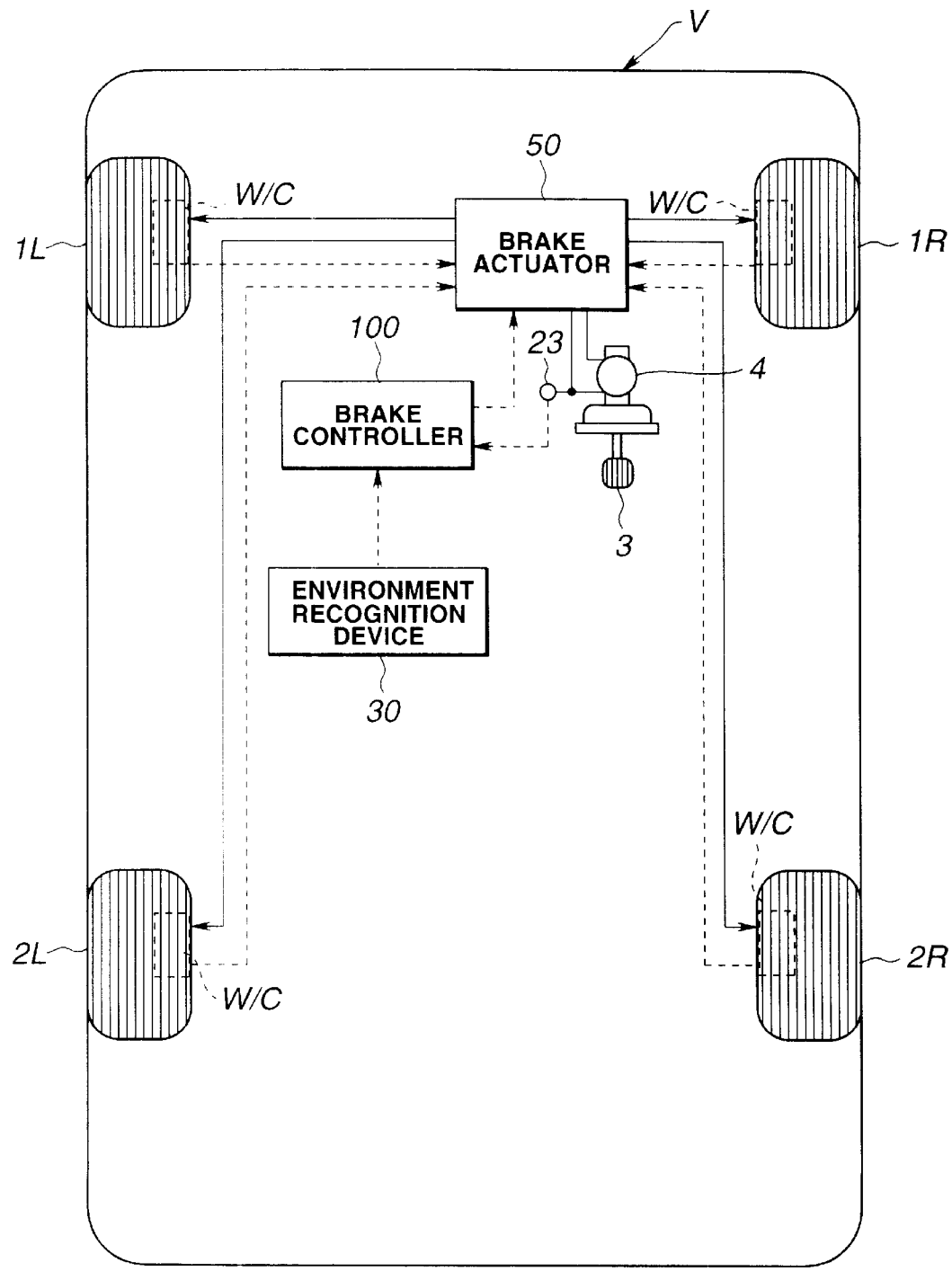
FIG. 8 is a schematic view of a fourth embodiment of the brake control system.

As shown in FIG. 8, the master cylinder 4 is connected to the brake pedal 3 so as to generate the pressure Pm by the depression of the brake pedal 3 by the driver. The generated master cylinder pressure Pm is supplied to the wheel cylinders W/C of the respective wheels 1L, 1R, 2L and 2R through the brake actuator 50. The braking force of each wheel 1L, 1R, 2L and 2R is independently controllable. When each wheel cylinder W/C receives the generated master cylinder pressure Pm as it is, the braking force corresponding to the pressure Pm is respectively applied to each wheel.

The brake actuator 50 is arranged to control the wheel cylinder pressure Pw/c at a target value determined by a brake controller 100. The brake controller 100 receives a signal form the master cylinder pressure sensor 23 to detect the pressure of the master cylinder 4. The signal indicative of the master cylinder pressure Pm may be replaced by the pedal depressing force or pedal depressing stroke which reflects braking intent of the driver. As a driver braking intent detector, a brake pedal depressing force sensor or brake pedal depressing stroke sensor may be used as a brake intent detecting means instead of the master cylinder pressure sensor 23. An environment recognition device 30 is installed to the vehicle V so as to detect and output the vehicle environment information according to the object of the brake controller 100. In addition to a picture processing device or navigation system, a non-contact type remote-sensing means for obtaining information as to object located around the vehicle may be used as the environment recognition device 30. For example, a device for detecting and processing the picture information of the vehicle V may be used as the remote sensing means.

The following table 1 shows examples functioning as the environment recognition device 30 and their recognizable contents.

TABLE 1

| Environment Recognition Device | Detectable Environmental Information |
|---|---|
| Navigation System Picture processing system | Kind of road, road curvature, road inclination and so on Environmental condition of road, obstacle and preceding vehicle, pedestrian, road curvature, road inclination, rain and snow, visibility (fog, darkness) and so on |
| Optical or radio wave radar | Obstacle and preceding vehicle, pedestrian, visibility (fog, darkness), road roughness and so on |
| Estimation from driver operation | Traffic snarl, mountain road, road curvature, rain and snow and so on |

Table 1 shows the detectable environmental information which is obtained by the various environment recognition devices. For example, the navigation system can obtain the type of road, road curvature, road inclination as vehicle environment information. It will be understood that the environment recognition device is not limited to the above-mentioned devices.

In this fourth embodiment, a navigation system is used as the environment recognition device 30. The navigation system 30 is arranged to output the information as to the type of the road such as urban road, suburb road, maintain road or expressway.

The brake controller 100 for executing the brake control receives the data relative to the type of the traveling road form the navigation system 30 and the master cylinder pressure Pm generated by depressing the brake pedal 3.

When the brake actuator 50 applies the braking force according to the braking intent of the driver during the braking operation, the brake controller 100 decides the control gain K according to the vehicle environment information and decides the target value Pw of the wheel cylinder pressure Pw/c on the basis of the master cylinder pressure Pm generated by the brake pedal depression by the driver. The brake controller 100 decides the target value Pw of the wheel cylinder pressure Pw/c by using the following equation (11) which is the same as the equation (10).

Target wheel cylinder pressure $Pw$=Master cylinder pressure $Pm$×Control gain $K$     (11)

The brake controller 100 previously stores the control gain data with regard to the suburb road, expressway, mountain road and urban road as follows.

1. suburb road - - - control gain K is set at 1 (K=1). That is, the master cylinder pressure Pm is adjusted to the wheel cylinder pressure Pw/c (Pm=Pw/c).

2. Expressway - - - the control gain K is set at a value greater than 1 (K>1).

3. mountain road - - - in up-slope the control gain is set to be smaller than 1 (K<1), and in down-slope the control gain is set to be greater than 1 (K>1).

4. urban road - - - when the brake is softly depressed, the control gain K is set to be smaller than 1 (K<1), and when strongly depressed, the control gain K is set to be greater than 1 (K>1).

With these previous setting, during the correction between the driver braking intent and the wheel braking force according to the road type information, a relationship between the driver braking intent and the wheel braking force on a suburb road is taken as a reference pattern. When the vehicle travels on an expressway, the braking force relative to the driver braking intent is set to be larger than the reference value. On an urban road, if the diver braking intent is small, that is, if the depression amount of the brake pedal 3 is small, the relationship is set to be smaller than the reference. If the driver braking intent is large, the relationship is set to be greater than the reference. On a down-slope of a mountain road, the relationship is set to be smaller than the reference. On an up-sloop of a mountain road, the relationship is set to be greater than the reference. That is, the controller 100 decides the target wheel cylinder pressure value Pw to execute the above mentioned change of the relationship between the driver braking intent and the wheel braking force according to the road type information. On the basis of the decided target value Pw, the brake controller 100 executes the control of the brake actuator 50. The brake actuator 50 functions to control the wheel cylinder pressure Pw/c at the target pressure value Pw.

The pressure control mechanism of the brake actuator 50 may be constituted by installing an electromotive type actuator as disclosed in the U.S. Pat. No. 4,653,815 to each of four wheels, and may be a hydraulic type actuator having a traction control function to each wheel.

In this fourth embodiment, the brake actuator 50 includes a drive circuit for driving the actuator 50 and has the ABS control function. Therefore, in case that the wheel lock will cause by increasing the wheel cylinder pressure Pw/c to the target pressure Pw, the brake actuator 50 Independently executes a control for avoiding the wheel lock. In order to execute this anti-lock braking control, the information indicative of the wheel speed is feedbacked to the brake actuator 50 as shown by the dotted line in FIG. 8. It will be understood that an actuator for executing the ABS control may be installed between the brake actuator 50 and the wheel cylinder W/C or the brake controller 100 may be arranged to have the ABS function if the brake actuator 50 is constituted not to have the ABS function.

Figure 9:
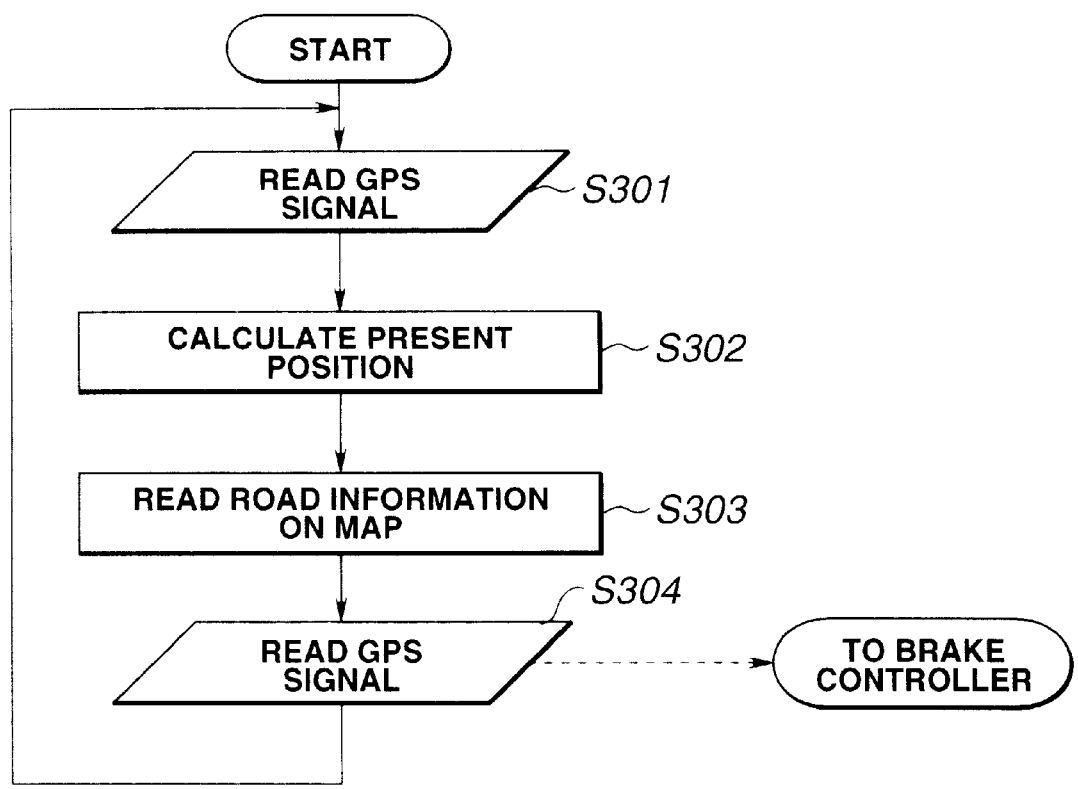
FIG. 9 is a flowchart of a control program executed in an environment recognition system of the fourth embodiment.
Figure 10:
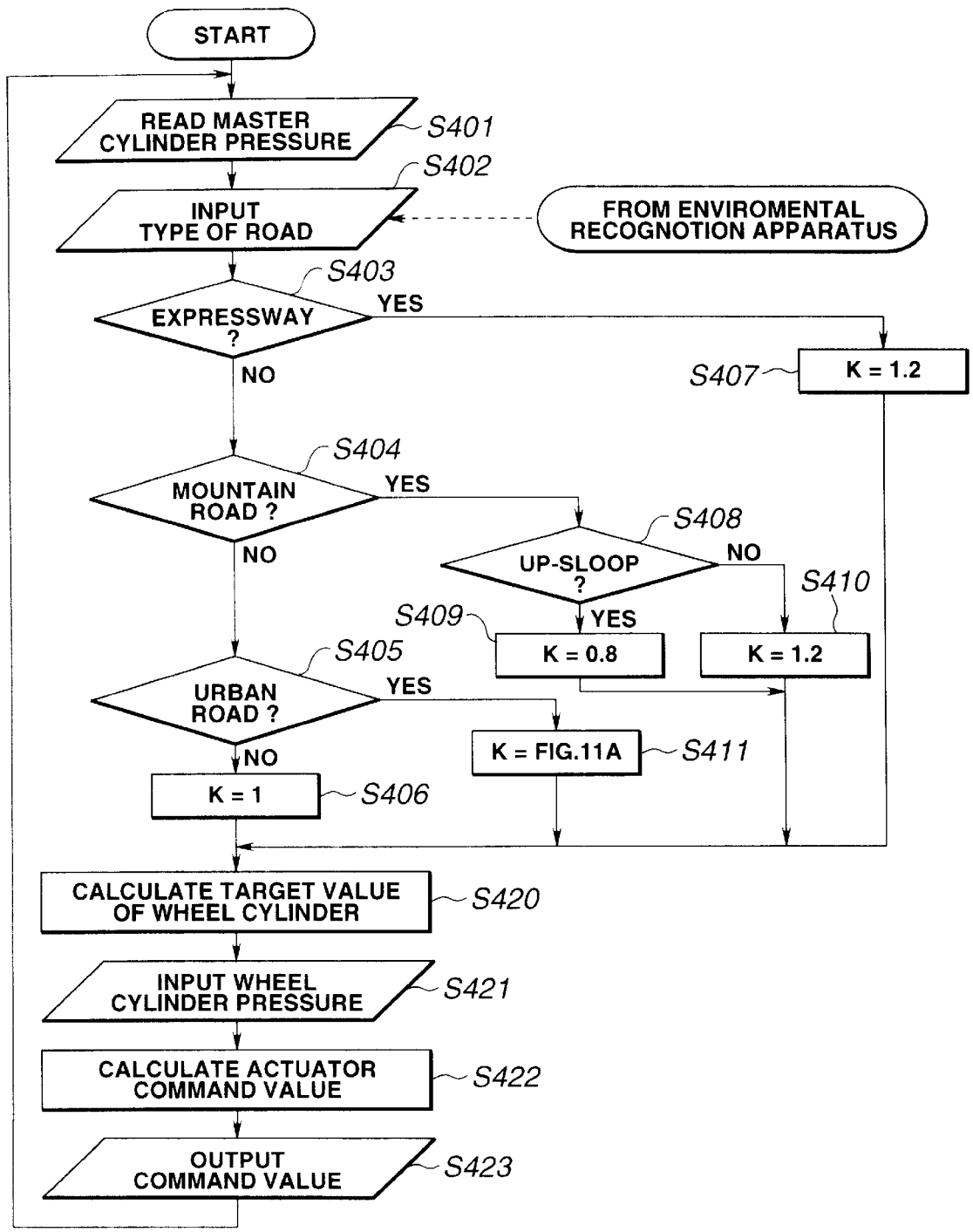
FIG. 10 is a flowchart of a control program executed by a brake controller of the fourth embodiment.

As shown in the flowchart of FIGS. 9 and 10, the manner of operation of the brake control system of the fourth embodiment is shown as is similar to that of the third embodiment.

The processing program executed in the navigation system 30 is shown in FIG. 9.

At a step S301, the navigation system (environment recognition device) 30 reads the GPS signal.

At a step S302, the navigation system 30 decides the present vehicle position.

At a step S303, the navigation system 30 reads the road information from the map.

At a step S304 the navigation system 30 decides the type of road and outputs it to the brake controller 100.

In the brake controller 100, the brake control shown in FIG. 10 is executed as follows.

At a step S401, the brake controller 100 reads the master cylinder pressure.

At a step S402, the brake controller 100 reads the road type information from the navigation system 30.

At a step S403, the brake controller 100 decides as to whether the vehicle V is now traveling on an expressway or not. When the answer at the step S403 is YES, the routine proceeds to a step S407 wherein the control gain K is set at 1.2 (K=1.2). When the answer at the step S403 is NO, the routine proceeds to a step S404 wherein the brake controller 100 decides as to whether the vehicle V is now traveling on a mountain road or not. When the answer at the step S404 is YES, the routine proceeds to a step S408 wherein the brake controller 100 decides as to whether the vehicle V is now traveling on an up-slope or not. When the answer at the step S408 Is YES, the routine proceeds to a step S410 wherein the brake controller 100 set the control gain K at 0.8 (K=0.8). When the answer at the step S408 is NO, the routine proceeds to a step S410 wherein the brake controller 100 set the control gain K at 1.2 (K=1.2). Following to the execution of the step S409 or S410, the routine proceeds to a step S420.

Figure 11A:
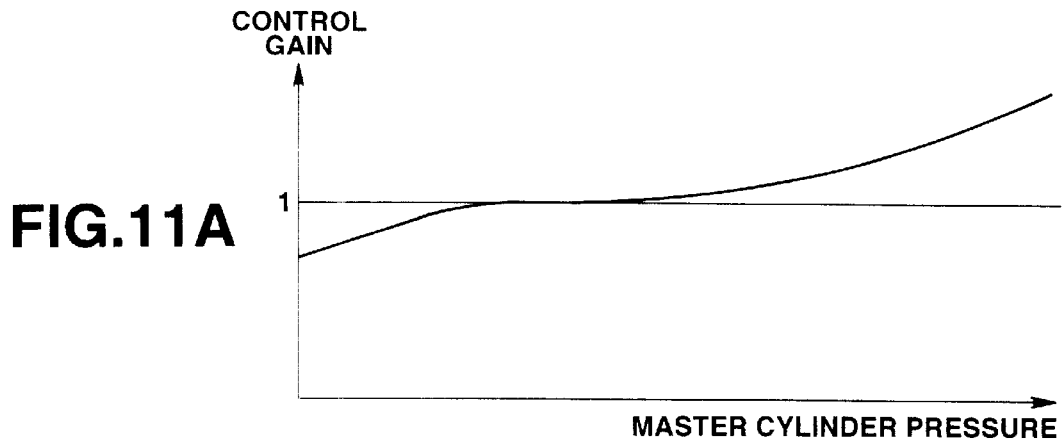
FIG. 11A and 11B are graphs which show controlled characteristics of control gain and wheel cylinder pressure relative to master cylinder pressure.

On the other hand, when the answer at the step S404 is NO, the routine proceeds to a step S405 wherein the brake controller 100 decides as to whether the vehicle is now traveling on an urban road or not. When the answer at the step S405 is YES, the routine proceeds to a step S411 wherein the brake controller 100 decides the control gain K on the basis of a map which shows a relationship between the control-gain the master cylinder pressure as shown in FIG. 11A. Following to the execution of the step S411, the routine proceeds to the step S420. When the answer at the step S406 is NO, the routine proceeds to a step S406 wherein the control gain K is set at 1 (K=1).

At the step S420, the brake controller 100 calculates the target value Pw of the wheel cylinder W/C by multiplying the master cylinder pressure Pm with the control gain K.

At a step S421, the brake controller 100 reads the wheel cylinder pressure Pw/c.

At a step S422, the brake controller 100 calculates the command value to be sent to the brake actuator 50.

At a step S423, the brake controller 100 outputs the calculated command value to the brake actuator 50.

After the execution of the step S423, the routine returns to the step S401 to repeat the brake control program shown in FIG. 10.

Next, with reference to the graphs shown in FIGS. 11A and 11B, a typical operation of the vehicle equipped with the brake control system of the fourth embodiment according to the present invention will be discussed.

In case that the vehicle is traveling on an urban road, the navigation system 30 detects the present vehicle position and obtains a position on the map by the processing in the steps S301 to S304. Then, the program shown in FIG. 10 proceeds in the order of the steps S403, S404, S405 and S411. At the step S411, the brake controller 100 decides the control gain K on the basis of the relationship shown in FIG. 11A. More particularly, when the brake pedal 3 is softly depressed, that is, when the master cylinder pressure Pm is smaller than a predetermined value, the brake controller 100 sets the control gain K at a value smaller than 1. When the brake pedal 3 is strongly depressed, that is, when the mater cylinder pressure becomes greater than the predetermined value, the brake controller 100 sets the control gain K at a value greater than 1.

Figure 11B:
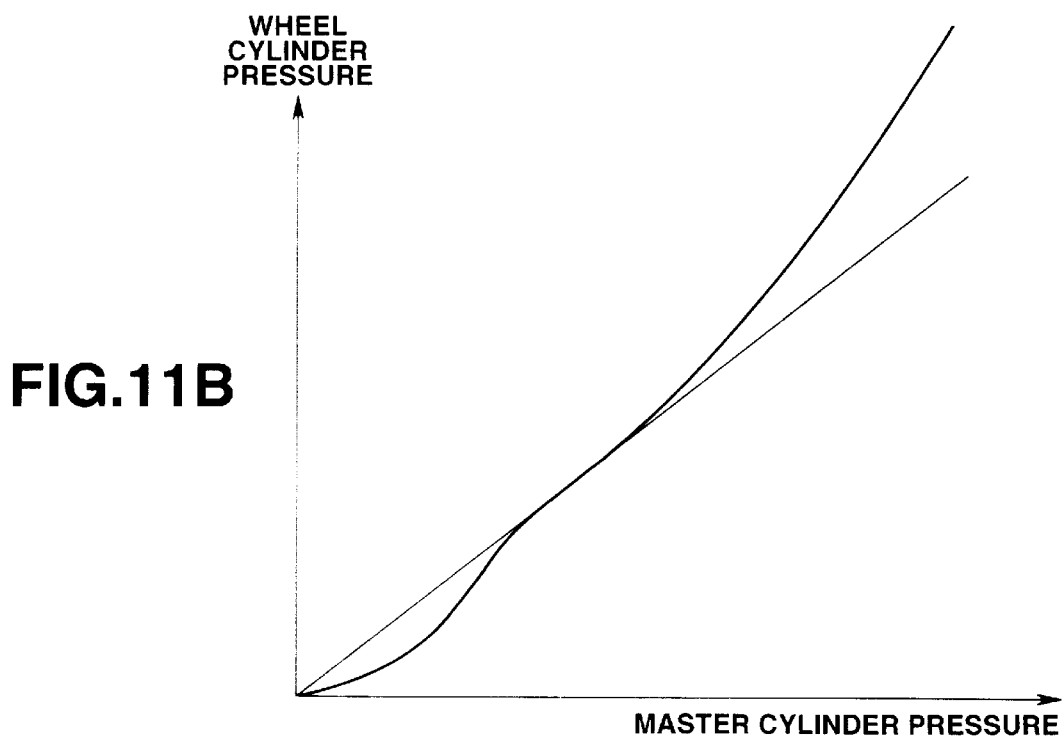

In this situation, when the brake pedal 3 is depressed, the target value Pw of the wheel cylinder pressure Pw/c is obtained as shown in FIG. 11B according the master cylinder pressure Pm. Accordingly, each wheel cylinder W/C of each wheel 1L, 1R, 2L, 2R is controlled at the target value Pw through the brake actuator 50 so as to decrease the vehicle speed. Thus, the control gain K is automatically determined, and the driver braking intent is corrected by this control gain K so that the braking is executed by adjusting the wheel cylinder pressure Pw/c to the target value Pw. This facilitates the braking correction executed by the driver.

When the vehicle travels on an urban road in the traffic snarl so as to frequently execute braking and acceleration, smooth acceleration and braking are ensured without requiring delicate pedal control. Further, if the brake pedal 3 is strongly depressed in reply to a sudden obstacle in a non-crowded condition, the braking distance is kept small because the control gain K is set to be greater than the reference in this situation.

On an expressway, since the control gain K is set to be greater than 1, the braking distance becomes short so as to avoid the close proximity to the preceding vehicle. In case that the vehicle V is traveling on an expressway, the program routine proceeds from the step S403 to the step S407 to set the control gain K at 1.2 (K=1.2). Therefore, the braking distance becomes short as compared to that of the standard case. This provides a comfortable expressway driving to the driver.

On a mountain road, the control program proceeds in the order of the steps S403, S404, S408 and S409 or S410. When the vehicle V travels on an up-slope of the mountain road, the control gain K is set at a value smaller than 1, such as K=0.8 at the step S409. When the vehicle V travels on a down-slope of the mountain road, the control gain K is set at a value greater than 1, such as K=1.2 at the step S410. Accordingly, on the up-slope of the mountain road, the braking force becomes small relative to the driver braking intent. On the other hand, on the down-slope of the mountain road, the braking force becomes great relative to the driver braking intent. That is, in case of up-sloop traveling, the wheel cylinder pressure Pw/c is corrected so as to be small relative to the reference value. In case of down-slope traveling, the control gain K is set at a value greater than 1 so that the wheel cylinder pressure target value Pw is set at a value greater than the master cylinder pressure Pm. Therefore, even on the mountain road, the wheel cylinder pressure Pw/c is controlled according to the road inclination (up and down). Particularly, this control prevents the elongation of the braking distance on the down-slope, so that the preferable and comfortable driving is ensured.

This fourth embodiment provides a brake control system which executes a brake control on the basis of the information from the vehicle environment recognition device 30. The brake control system of the fourth embodiment according to the present invention comprises the environmental recognition device 30 for recognizing vehicle environment, the brake controller 100 which determines the brake control gain K according to the environmental condition and determines a target braking force by correcting the driver braking intent by the determined control gain K, and a brake actuator 50 which generates the target braking force. Since this brake control system automatically determines the brake control gain K according to the vehicle environment such as road type, up or down of mountain road, and brake depression degree on urban road, the driver becomes free from executing a correcting operation of the brake pedal depression according to the vehicle environment. That is, the driver may keep the depression degree of the brake pedal same to obtain the same braking distance even in various road conditions.

Although the fourth embodiment has been shown and described to use the navigation system as the environment recognition device 30, it will be understood that a picture processing apparatus for detecting traffic snarl, road environment and road inclination, or a method for detecting a traffic snarl from the depressing operation of the brake pedal by the driver may be used as the environment recognition device 30. Of course, it is possible to use other method for detecting road type or determining the control gain.

For example, even in a brake control on a mountain road, the brake control may be executed upon adding the processing of the steps S210 and S211 of the third embodiment. In such case, the control gain K may be determined according to the road inclination Sn or a gravity amount applied to the vehicle V due to the road inclination so as to ensure further fine control. It will be understood that this combination is not limited to a case of a mountain road and may be applied to an urban road, an expressway, and a suburb road.

Next, the fifth embodiment of the brake control system according to the present invention will be discussed. The fifth embodiment is constructed so as to be basically the same as that of the fourth embodiment shown in FIG. 8. In this fifth embodiment, a picture processing apparatus is used as the environment recognition device 30 and outputs the road curvature as vehicle surrounding information. That is, the environment recognition device 30 shown in FIG. 8 is the picture processing device 30 which sends the vehicle environment information to the brake controller 100. It will be understood that the picture processing device 30 may be replaced by a forward monitor camera shown in the first embodiment.

The control program of the environment recognition device 30 and the controller 100 is basically the same as that of the fourth embodiment. A part of the control program may be re-arranged to achieve the control of this embodiment. The other construction of the fifth embodiment is basically the same as that of the fourth embodiment.

With this fifth embodiment, it becomes possible to correct the driver braking intent according to the control gain K decided according to the road curvature. For example, the controller 100 increases the control gain K of the front wheels 1L and 1R and decreases the control gain K of the rear wheels 2L and 2R in accordance with the increase of the road curvature. By this correction, during braking, the front wheel braking force is increased and the rear wheel braking force is decreased relative to the driver braking intent according to the increase of the road curvature.

Since the proper control gain K according to the road curvature is automatically determined to each wheel cylinder W/C, it becomes unnecessary that the driver delicately corrects the depression degree of the brake pedal 3 according to the vehicle environment. Further, since the vehicle environment, which can not be recognized by the driver, is automatically taken account for the correction of the control gain K, by sending the information from the picture processing device 30 to the brake controller 100, the driver ensures a further improved derivability in braking operation. In addition, according to the increase of the road curvature the control gain K of the front wheel is increased and the control gain K of the rear wheel is decreased. This control prevents the rear wheels from loosing their road grip and promotes the front wheels to increase their braking force by the decrease in the rear wheels. Therefore, the undesired vehicle behavior by the braking in the cornering is improved without changing the braking distance so as to improve the drivability of the vehicle.

Further, it will be understood that the wheel cylinder pressures of right and left wheels are differentiated during the braking in the turning operation. In such case, the control gain K of each of the inside and outer side wheels is determined such that the braking force of the outer side wheel is increased relative to the driver braking intent. It is preferable that the brake controller 100 increases the control gain K of the outer side wheel relative to the cornering direction and decreases the control gain K of the inner side wheel relative to the cornering direction. With this arrangement, the undesired vehicle behavior during the braking in the turning operation is positively avoided.

Although the fifth embodiment has been shown and described such that the picture processing device 30 is used as the environment recognition device in order to obtain the road curvature, it will be understood that a navigation system shown in the third and fourth embodiments may be used to obtain the road curvature. By such arrangement, the time necessary for processing the picture is decreased so as to improve the control speed.

It will be understood that a method for estimating the road curvature from the operation of the driver may be utilized instead of the above-mentioned devices. For example, the road curvature may be estimated from the steer angle steered by the driver. By such arrangement, actual vehicle cornering information is obtained so as to further actually execute the brake control.

Next, the sixth embodiment of the brake control system according to the present invention will be discussed. The sixth embodiment is constructed so as to be basically the same as that of the fourth embodiment shown in FIG. 8. The sixth embodiment is arranged to use a radar apparatus as the environment recognition device 30. The radar apparatus 30 includes one of an optical radar apparatus and a radio wave radar. Such an optical radar apparatus 30 is arranged to measure a distance between the object by emitting a right and receiving the reflect of the right from the object. The radio wave radar 30 is arranged to measure a distance between the object by emitting radio wave and receiving the reflect of the radio wave from the object. These radar apparatuses can obtain the obstacle information without directly contacting with the object such as an obstacle put in the forward and a preceding vehicle. FIG. 8

The radar apparatus 30 is arranged to detect the relative speed and distance of the preceding obstacle and output such information to the controller 100. The controller 100 is arranged to increase the control gain K when the approaching speed of the detected obstacle is greater than a predetermined speed or when the distance to the preceding obstacle is shorter than a predetermined distance. The fifth embodiment corresponds to a case that the environment recognition means is a remote sensing means which outputs information regarding an obstacle preceding to the vehicle and a preceding vehicle.

With this sixth embodiment, the advantages ensured by the aforementioned embodiments are also ensured. Further, the braking force relative to the driver braking intent is increased according to the degree to the close proximity to the preceding obstacle, approaching speed to the preceding obstacle, or both of them. Therefore, even if a driver of the preceding vehicle suddenly increased the depression degree of the brake after the driver of the vehicle V starts a braking in response to the braking of the preceding vehicle, the braking force of the vehicle is automatically increased by keeping the depression degree of the brake pedal 3. This prevents the close proximity to the preceding vehicle. In addition, when the preceding vehicle is accelerated, the brake control system operates to decrease the braking force to decrease the deceleration degree so as to inform the acceleration of the preceding vehicle to the driver of the vehicle V. Since this brake control system is different from an automatic braking system by which the braking is started upon detecting an obstacle in the forward, undesired braking due to the wondering dust is prevented.

Although the sixth embodiment has been shown and described to use the radar apparatus as the environment recognition device 30, it will be understood that the present invention is not limited thereto and may use a picture processing apparatus for detecting the picture showing a frontward view of the vehicle for the purpose of the detection of forward obstacle. By this arrangement, it becomes possible to decide the size of the obstacle. This improves the accuracy of the brake control system.

Next, the seventh embodiment of the brake control system according to the present invention will be discussed. The seventh embodiment is constructed so as to be basically the same as that of the fourth embodiment shown in FIG. 8. The seventh embodiment is arranged to install an environment estimating apparatus from the driver operation in order to detect rain or snow as environment information. The environment recognition device 30 of this embodiment includes a wiper switch manipulated by the driver. By detecting the operation degree set by the wiper switch, the environment recognition device 30 detects the intensity of rain or snow. The controller 100 is arranged to transiently decrease the control gain K when it rains or snows heavily so as to transiently decrease the braking force relative to the driver braking intent.

With this arrangement of the seventh embodiment, in addition to the ensure of the aforementioned advantages, the vehicle behaves so as not to cause lock of tires during braking since the wheel cylinder pressure Pw/c is delayedly increased relative to the master cylinder pressure Pm to avoid radical increase of the braking force. Therefore, the driver can drive the vehicle V without having some anxiety due to the operating noise and kick back of the brake pedal 3.

It will be understood that the environment recognition device 30 is not limited to the aforementioned device and may be a picture processing apparatus by which raining and snowing are detected. This arrangement is applicable to a case where the wiper operation becomes small by the application of the water repellency window.

Next, the eighth embodiment of the brake control system according to the present invention will be discussed. The eighth embodiment is constructed so as to be basically the same as that of the fourth embodiment shown in FIG. 8. In this eighth embodiment, a navigation system is used as the environment recognition device 30 and outputs information informing as to whether a now traveling road is a paved road or not. The brake controller 100 is arranged to transiently decrease the control gain K when the traveling road is not a paved road so that the braking force is transiently decreased relative to the driver braking intent.

With this arrangement, the brake control system functions so as to suppress the tire lock on the unpaved road. Accordingly, it becomes possible to avoid undesired ABS control even on the unpaved road, and the driver can drive the vehicle without having some anxiety due to the operating noise and kick back of the brake pedal 3.

It will be understood that the environment recognition device 30 for detecting a paved road may not be limited to the navigation system and may utilize a method for detecting roughness of a road surface by detecting a stroke depth or stroke speed of a suspension, a picture processing apparatus or a method for detecting roughness of a road surface by pulsating right or electric wave and receiving their reflection. If such a method is applied as the environment recognition device 30 to the brake control system according to the present invention, the brake control system can be adapted to a road which is not recorded in a map of the navigation system.

Although the present invention has been described in its preferred embodiments, it is to be understood that various modifications may be made therein. For example, the third embodiment may be modified to further include a forward monitor camera employed in the first embodiment in order to be used with the navigation system in combination. Further, it will be understood that the means for measuring a road inclination is not limited to the navigation system or forward monitoring camera. A brake actuator used with the forward monitor camera may be arranged to control the wheel cylinder pressure to the target value in the ABS braking control and to the master cylinder pressure in other situation.

It will be understood that more than two kind of devices shown in Table 1 may be used as the environment recognition device in the fourth embodiment. For example, if the brake control system is arranged to obtain a road curvature as environment information, all of a navigation system, a picture processing system and a system for estimating the road curvature from a driver operation may be installed and selectively or combiningly used so as to further improve the reliability of the road curvature.

Furthermore, it will be understood that the brake control system according to the present invention may be arranged such that a part or all of the detectable environment information shown in Table 1 may be treated as environment information. For example, if a navigation system is applied as the environmental recognition device 30, a part or all of road type, road curvature and road inclination may be treated as environmental information. If a picture processing apparatus is applied as the environment recognition device 30, a part or all of road surrounding condition, obstacle and preceding vehicle, pedestrian, road curvature, road inclination, rain and snow, visibility (fog, darkness) may be treated as environmental information. If a radar apparatus is applied as the environment recognition device 30, a part or all of obstacle including preceding vehicle, pedestrian, visibility (fog, darkness) and road roughness may be treated as environmental information. If an estimating method based on the driver operation is applied as the environmental recognition device 30, a part or all of traffic snarl, mountain road, road curvature, rain and snow may be treated as environmental information.

What is claimed is:

1. A brake control system for executing a braking of a vehicle, comprising:
   means for detecting driver braking intent;
   an actuator that applies braking force to each wheel on the basis of the detected driver braking intent;
   a road inclination detector that detects an inclination of a road on which the vehicle travels; and
   a controller that changes a relationship between the driver braking intent and the braking force of each wheel according to the detected road inclination.

2. A brake control system as claimed in claim 1, further including an obstacle sensor that obtains information indicative of an obstacle located near the vehicle without directly contacting the obstacle.

3. A brake control system as claimed in claim 2, the obstacle information includes information relating to at least one of an obstacle preceding the vehicle and a preceding vehicle.

4. A brake control system as claimed in claim 3, wherein the controller increases the braking force relative to the driver braking intent according to increase in at least one of proximity to a forward obstacle or preceding vehicle and the approaching speed to a forward obstacle or the preceding vehicle.

5. A brake control system as claimed in claim 2, wherein the obstacle sensor includes one of a device for reading and processing picture information indicative of vehicle environment, a device for measuring a distance between an obstacle and the vehicle by emitting light and receiving the reflection of the light from the obstacle, and a device for measuring a distance between an obstacle and the vehicle by emitting radio wave and receiving the reflection of the radio wave from the obstacle.

6. A brake control system as claimed in claim 1, further including a device that estimates vehicle environment information from the operation of the driver.

7. A brake control system as claimed in claim 6, wherein the environment information includes a type of road.

8. A brake control system as claimed in claim 7, wherein said controller treats a relationship between the driver braking intent and the braking force on a suburb road as a reference, increasing the braking force relative to the driver braking intent on an expressway, decreasing the braking force relative to the driver braking intent when the vehicle travels on an urban road and the driver braking intent is small, increasing the braking force relative to the driver braking intent when the vehicle travels on the urban road and the driver braking intent is large, increasing the braking force relative to the driver braking intent when the vehicle travels on a downwardly sloped road, and decreasing the braking force relative to the driver braking intent when the vehicle travels on an upwardly sloped road.

9. A brake control system as claimed in claim 1, further including a device that determines a road curvature, the controller also changing the relationship between the braking force of each wheel according to the road curvature determined.

10. A brake control system as claimed in claim 9, wherein the controller increases the braking force of front wheels and decreases the braking force of rear wheels as the road curvature increases.

11. A brake control system as claimed in claim 9, wherein the controller increases the braking force of outer side wheels relative to the driver braking intent during turning operation.

12. A brake control system as claimed in claim 1, wherein the road inclination detector comprises a navigational system from which a vehicle traveling position is obtained, wherein the road inclination is obtained from a map or change of the vehicle traveling position on the basis of the obtained vehicle traveling position.

13. A brake control system as claimed in claim 12, wherein the road inclination is obtained from the map and the vehicle traveling position is changed forward according to the increase of the vehicle speed.

14. A brake control system as claimed in claim 1, further including means for detecting at least one of snow and rain conditions.

15. A brake control system as claimed in claim 14, wherein the controller decreases the braking force relative to the driver braking intent when a heavy snow or rain condition is detected.

16. A brake control system as claimed in claim 1, wherein the driver braking intent detecting means comprises one of a master cylinder pressure detector, a brake pedal depressing force detector, and a brake pedal depressed stroke detector.

17. A brake control system as claimed in claim 16, wherein the controller increases one of the braking force and the wheel cylinder pressure relative to the driver braking intent when the vehicle travels on a downwardly sloped road.

18. A brake control system as claimed in claim 1, further including means for determining whether the vehicle traveling road is a paved road.

19. A brake control system as claimed in claim 18, wherein the controller decreases the braking force relative to the driver braking intent when the traveling road is an unpaved road.

20. A brake control system as claimed in claim 1, wherein the road inclination detector comprises a navigation system that detects a vehicle position, wherein the road inclination is determined based on environmental information of the vehicle position stored in a map.

21. A braking control system as claimed in claim 1, wherein the controller changes the relationship between the driver braking intent and the braking force to keep a distance corresponding to the driver braking intent constant even if the road inclination is varied.

22. A braking control system as claimed in claim 1, wherein the controller changes the relationship between the driver braking intent and the braking force so that a braking distance based on the braking intent becomes equal regardless of the road inclination.

23. A brake control system of a vehicle, comprising:
    a road inclination sensor that measures an inclination of a road;
    a pressure generating source that generates a brake pressure corresponding to a brake operating force applied by a driver;
    an actuator that controllably changes the brake pressure and applies the changed pressure to each wheel cylinder;
    a controller that calculates a target value of the wheel cylinder pressure on the basis of the measured road inclination and controls the wheel cylinder pressure to the target value by driving said actuator.

24. A brake control system as claimed in claim 23, wherein the road inclination sensor comprises a forward monitoring camera that monitors a forward direction of the vehicle, wherein the road inclination is measured by obtaining a change ratio of the road inclination from picture information obtained by the forward monitoring camera and by executing an integral of an initial value relative to the change ratio of the road inclination.

25. A brake control system as claimed in claim 24, wherein the initial value of the road inclination is obtained from a drive force obtained from an output torque of the engine and an acceleration of the vehicle.

26. A brake control system as claimed in claim 24, wherein the initial value of the road inclination is obtained from a drive force obtained from a slip ratio of a torque converter and an acceleration of the vehicle.

27. A brake control system as claimed in claim 24, wherein the inclination change ratio is changed according to the vehicle speed.

28. A brake control system as claimed in claim 23, wherein the target value of the wheel cylinder pressure is determined by changing the pressure of the pressure generating source in proportion to the road inclination.

29. A brake control system as claimed in claim 23, wherein the target value of the wheel cylinder pressure is determined by increasing the pressure of the pressure generating source in proportion to the road inclination when the target value is increased.

30. A brake control system as claimed in claim 23, wherein a proportion constant, which is applied to the calculation of the target value of the wheel cylinder pressure, is set from a standard loaded weight of a vehicle and brake system components.

31. A brake control system as claimed in claim 23, wherein the pressure of the pressure generating source is mechanically transferred to the wheel cylinder when the actuator is not operated.

32. A brake control system as claimed in claim 23, wherein the actuator always controls the wheel cylinder pressure on the basis of a master cylinder pressure to the target value when the brake control is executed and the actuator always controls the wheel cylinder pressure on the basis of the master cylinder pressure to follow the pressure of the pressure generating source when the brake control is not executed.

33. A method of controlling braking of a vehicle, comprising:
    determining an inclination of a road on which the vehicle is traveling;
    deciding a brake control gain according to the determined road inclination;
    detecting braking intent of a driver;
    deciding a target value of a braking force by correcting driver braking intent through the brake control gain; and
    controlling a brake actuator to generate the braking force corresponding with the target value.

34. A brake control system for a vehicle comprising:
    a wheel cylinder that is installed to each wheel of the vehicle and generates a braking force by increasing the pressure applied to the wheel cylinder;
    a brake pedal application detecting device that detects a braking intent of a driver;
    a vehicle environment recognition device that detects vehicle environment, including a road inclination;
    an actuator that applies hydraulic pressure to the wheel cylinder at a target value; and
    a controller that determines a target value of the wheel cylinder pressure on the basis of the driver braking intent and at least the road inclination to ensure a predetermined braking distance with respect to the predetermined braking intent of the driver.

35. A braking force control device for a vehicle, comprising:
    a wheel braking cylinder associated with each wheel of the vehicle;
    an actuation means for generating a main braking pressure corresponding to a force applied thereto;
    a brake actuation device that supplies the main braking pressure to the wheel braking cylinder and sets the braking pressure applied to the wheel braking cylinder, wherein the braking pressure applied to the braking cylinders is increased or decreased based on vehicle environmental conditions;
    a vehicle environmental recognition means for detecting the environmental conditions; and
    a controller that determines a road inclination on the basis of the detected environmental conditions, wherein the controller generates a correction value corresponding to the road inclination and corrects the target braking pressure applied to the braking cylinder.

* * * * *